Feb. 6, 1962 W. DEANS 3,020,329

HOUSING FOR BUS RUN

Filed Nov. 22, 1957 3 Sheets-Sheet 1

INVENTOR.
WILLIAM DEANS
BY Ostrolenk, Faber, Gerb & Soffen
ATTORNEYS

INVENTOR.
WILLIAM DEANS
BY Ostrolenk, Faber, Gerb & Soffen
ATTORNEYS

Feb. 6, 1962

W. DEANS 3,020,329

HOUSING FOR BUS RUN

Filed Nov. 22, 1957

3 Sheets-Sheet 3

INVENTOR.
WILLIAM DEANS

BY Ostrolenk, Faber, Gerb & Soffen
ATTORNEYS

3,020,329
HOUSING FOR BUS RUN

William Deans, Ridgewood, N.J., assignor to I-T-E Circuit Breaker Company, Philadelphia, Pa., a corporation of Pennsylvania Filed Nov. 22, 1957, Ser. No. 698,094
2 Claims. (Cl. 174—16)

My invention relates to housing for isolated phase bus, and more specifically, to a bus housing constructed and comprised of a plurality of metallic members arranged to substantially decrease induced current in the metallic housing.

In metal enclosed electrical A.-C. bus systems of the type shown in U.S. Patent No. 2,706,744 to H. H. Rudd, and No. 2,469,445 to W. M. Scott, Jr., heat generated within the bus must pass through the housing so as to allow cooling of the bus. The bus housing, however, is in itself heated due to the circulating currents induced in the housing. Hence, these induced currents produce heating in the housing itself and therefore elevate the temperature of the housing so that the temperature of the conductor within the housing must be high in order that heat will flow from the conductor to areas outside of the housing.

If a low temperature rise for the bus is to be maintained, it is necessary to keep bus housing temperature low. This can be achieved if the $I^2R$ losses in the bus housing can be reduced.

The induced currents that flow in the bus housing are the result of voltages induced in the housing in a direction parallel with the conductors. Since the magnitudes and phases of the induced voltages are different when taken along a different longitudinal segment of the housing, induced currents will flow as a result of these voltage differences.

The principle of my invention is to construct the metallic bus housing of a plurality of segments which are insulated from one another and are so arranged as to limit the unbalanced voltages existing within their limited areas so as to substantially reduce the magnitude of induced current and thereby substantially reduce the heating effects due to these induced currents.

Accordingly, a primary object of my invention is to reduce the heat in a bus enclosure.

Another object of my invention is to provide a housing for enclosing a bus bar which is constructed of a plurality of longitudinal metallic members connected to one another, by a relatively high resistance means such as an insulator.

It is desirable that a path to ground be provided for an arc from the bus to the housing. This path to ground may be provided in the instant invention by merely securing a small portion of each of the individual segments of the housing of my invention to a ground connection without substantially increasing induced currents within each of these segments.

Accordingly, a still further object of my invention is to provide means for connecting each of the segments of my novel bus housing to a ground connection.

These and other objects of my invention will become apparent from the following description when taken in conjunction with the drawings in which.

Figures 3, 3A, 4, 5, 5A:
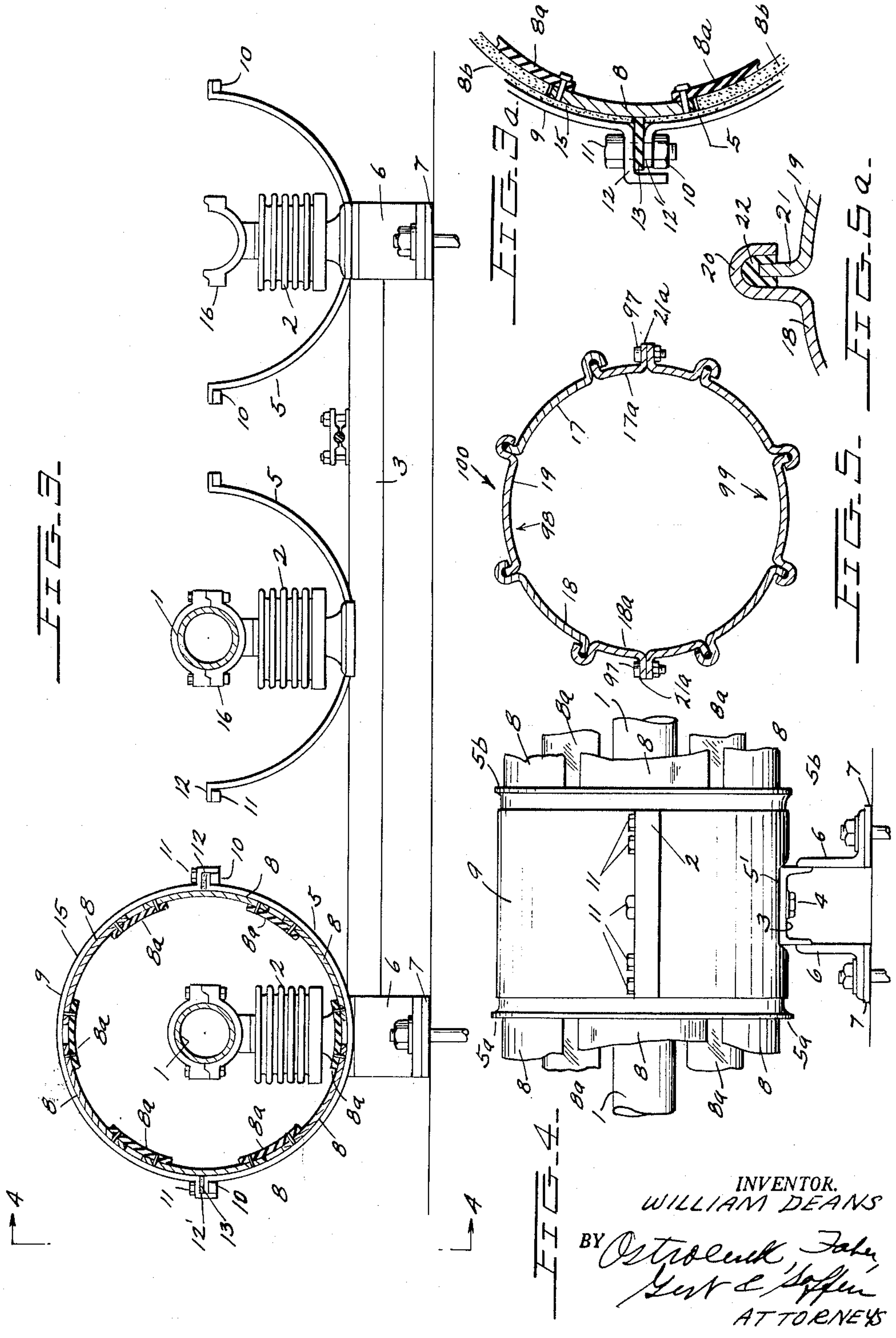
FIGURE 3 shows a cross-sectional view of another embodiment of my invention wherein a bus is supported by a single insulator within a housing which is adapted in accordance with my invention.
FIGURE 3A is a fragmentary enlarged section showing the connection and gasketing between the half-rings and the gasketing between the bus housing and half-rings of FIGURE 3.
FIGURE 4 shows a cut-away side view of FIGURE 3 taken in the direction 4—4 of FIGURE 3.
FIGURE 5 shows a third embodiment of my novel invention.

FIGURE 5*a* shows a detailed enlarged view of the manner in which insulation segments and conductor segments of FIGURE 5 may be joined to one another.

Figures 6, 6A, 7:
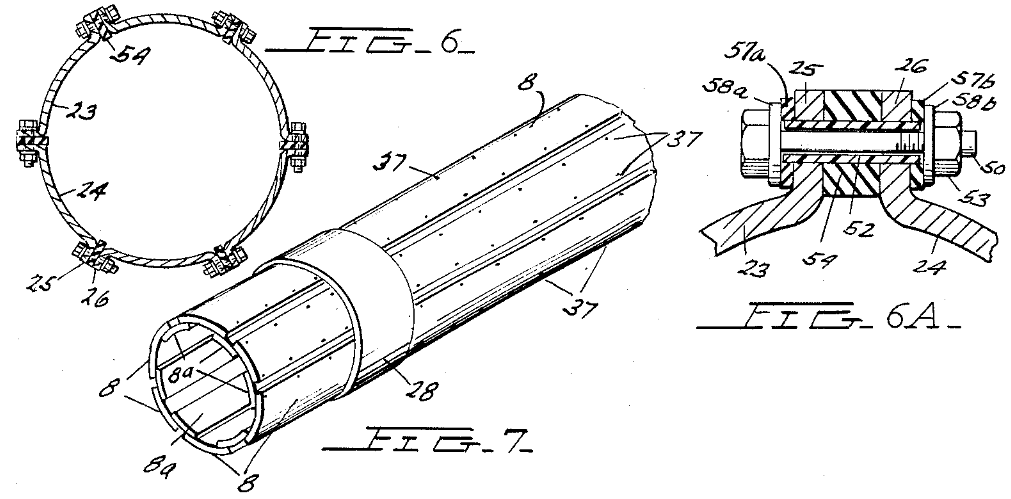

FIGURE 6 shows a still further embodiment of my novel invention.

FIGURE 6*a* shows a detailed enlarged view of the manner in which metallic segments of FIGURE 6 may be joined and insulated from one another.

FIGURE 7 shows a perspective view of my novel invention being adapted to a grounding means.

Figure 8:
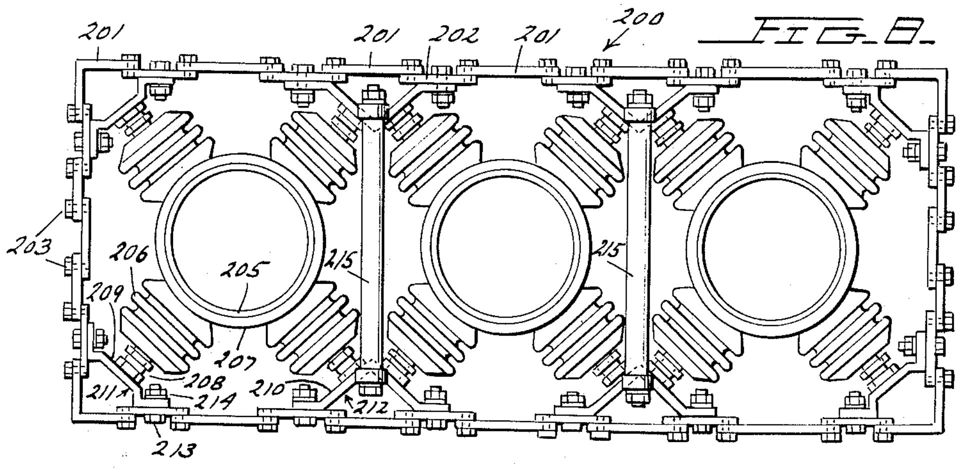

FIGURE 8 shows one manner in which my novel invention may be adapted to a square or rectangular enclosure of the type utilized with segregated and non-segregated bus.

Figure 9:
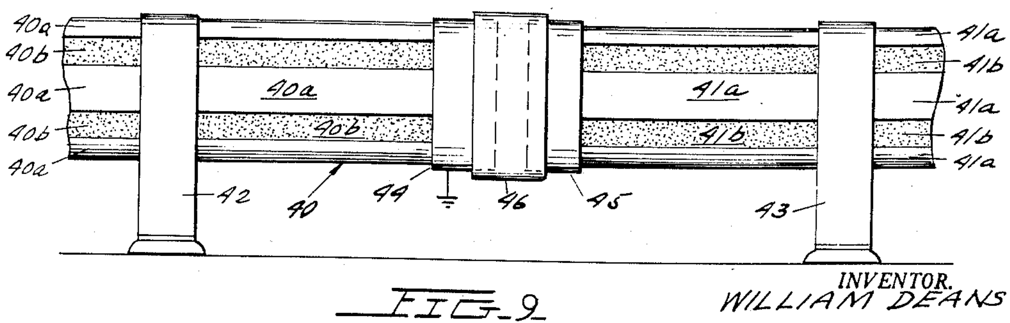

FIGURE 9 shows one manner in which longitudinal segments of two housing units may be supported and connected to one another.

Figures 1, 2:
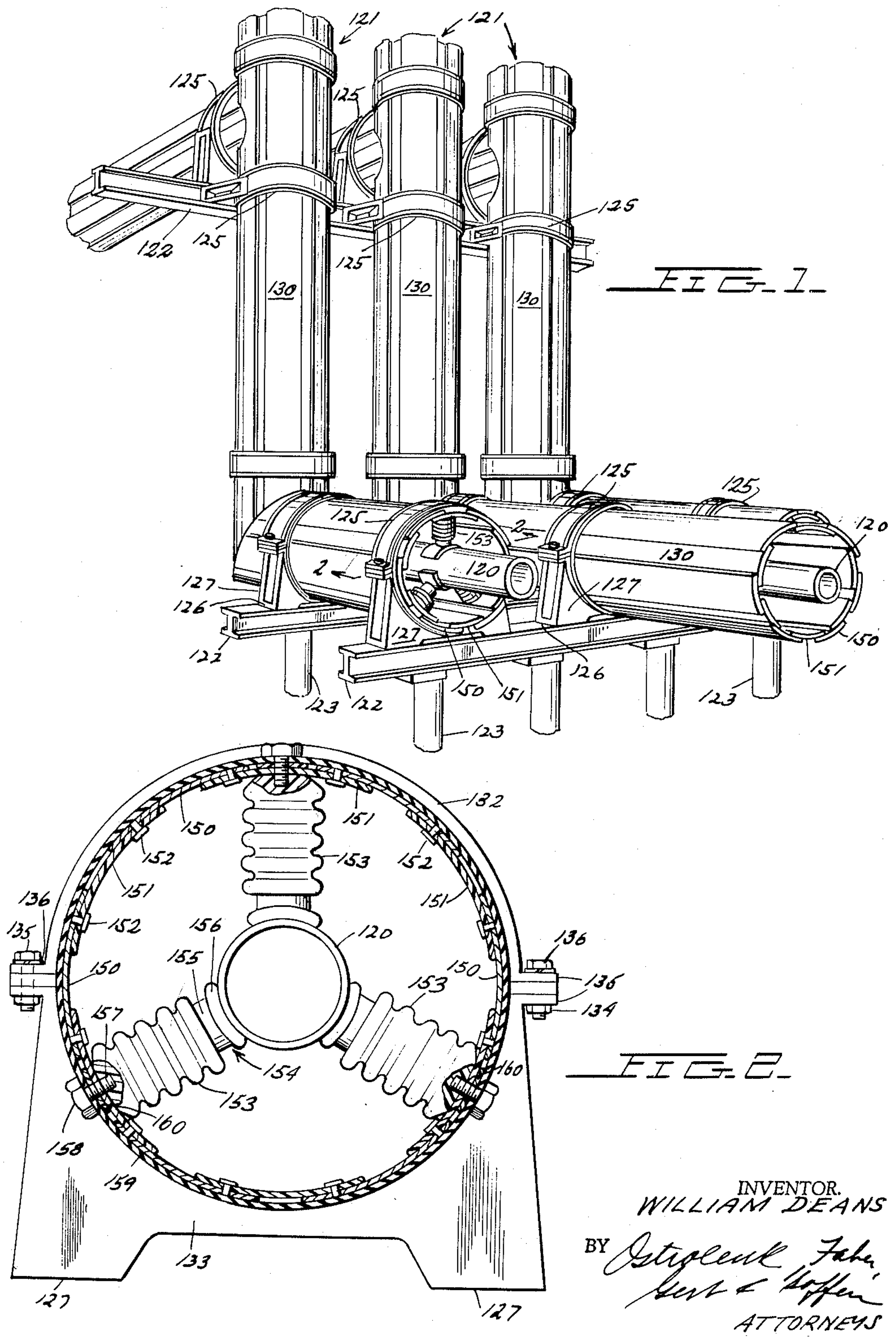
FIGURE 1 is a perspective view of a three phase isolated phase bus run wherein the bus housing is constructed in accordance with this invention.
FIGURE 2 is a cross-section of one phase of the isolated phase bus run of FIGURE 1 looking in the direction of arrows 2—2.

Referring now to FIGURES 1 and 2, I have shown a three phase bus system comprising for each phase 121 a bus conductor 120 supported within its own continuous housing 130. The housings are supported from any suitable structural members which, in this case, are shown to be a plurality of I-beams 122 which, in turn, are supported on risers 123.

A metallic supporting ring 125 is secured to the I-beams 122 in any suitable manner, preferably by bolts passing through base 126 of supporting legs 127 of the metallic supporting members 125 and into the flanges of I-beams 122. Supporting rings 125 for each housing 130 are spaced apart by distances which are determined by the length of housing 130. Accordingly, I-beams 122 and the supporting structure for said I-beams 122 are likewise spaced in accordance with the predetermined dimensions of housing 130.

Structural ring 125 comprises an upper-half section 132 and a lower half section 133 which are bolted together by bolts 136 which pass through ledges 135 at the ends of each half section 132, 133 and are retained by nuts 134.

Each housing 130 comprises longitudinally extending conducting members 150 and longitudinally extending insulating members 151 arranged alternately and secured together in any suitable manner as by rivets 152. Tubular bus bar 120 is centered within housing 130 and insulated therefrom by means of three ceramic standoffs 153 disposed 120° apart and lying in the same transverse plane as supporting ring 125.

A saddle 154 is mounted to one end of standoff 153 with shank 155 of saddle 154 extending into standoff 153 and bus supporting section 156 engaging the outside surface of bus bar 120. The other end of standoff 153 is fitted with a threaded insert 157 which is engaged by bolt 158 for fastening standoff 153 within bus housing 130.

Insulating ring 159 is interposed between bus housing 130 and metallic supporting ring 125 to prevent ring 125 from electrically connecting the longitudinally extending conducting members 150 of bus housing 130. Insulators 160 are interposed between insulating ring 159 and conducting members 150 to fill in the circumferential spaces between insulating members 151. It is to be noted that insulating standoffs 153 each contact a longitudinally extending insulating member 151. In this manner even though bolts 158 pass through metallic supporting ring 125 none of the longitudinally extending conducting members 159 are electrically connected together through bolts 158.

Referring now to FIGURES 3 and 4, it is seen that the bus or conductor 1 is supported by a single insulator 2 which is installed in longitudinally spaced relation with respect to the other insulators 2 of the three phase system shown.

At each insulator 2 the half-ring or semi-circular plate 5 is arranged between the insulator 2 and its support 3, the half-ring 5 having a flat section 5′ (FIGURE 4) which is clamped between the insulator base and support 3. Angles 6 are welded to the channel 3 for mounting the same upon a rigid support, which may be a concrete floor or wall or a skeleton framework, and shims 7 of appropriate selected thicknesses may be used between the angle 6 and the supporting structure to obtain the desired linear disposition of the buses or conductors 1.

A pre-formed tubular housing which is comprised of the longitudinal conducting members 8 and insulating longitudinal members 8*a*, is rigidly constructed as by riveting or any other desired fastening means so as to maintain the conductor segments 8 in an insulated spaced relationship with one another in accordance with my novel invention. This pre-formed tubular housing comprised of segments 8 and 8*a* is supported at its ends by the half-rings 5 and is rigidly secured and clamped into position by the cooperation of removable half-ring 9 with rigid half-ring 5. Thus, housing 8—8*a* surrounds the bus 1 which is supported by insulator 2. The half-rings 5 and 9 can be made from metals or alloys with magnetic or non-magnetic characteristics according to the design requirements for any particular installation.

Although members 8*a* have been described as being insulating material, it is to be understood that while insulating material is preferred, material having only a greater electrical resistance than that of the conductors 8 could serve as the insulating material.

It is to be noted that while the bus housing comprised of longitudinal strips 8 and 8*a* at the right of FIGURE 4 can be directly clamped to the half-rings 5, 9 that bus housing 8—8*a* is maintained in insulated relationship with respect to half-ring 5, 9 by means of the insulating strip 5*a*. Hence, in the event that the half-rings 5, 9 are connected to ground, each of the conductors 8 of the bus housing at the right will be connected to ground while the conductors 8 of the bus housing at the left are insulated from ground at the particular ring support in question. However, the ring support 5, 9 clamping the left end of the left bus housing of FIGURE 4 will connect this left end to ground as in the case with the bus housing at the right of FIGURE 4.

If desired, a tubular conducting strip 5*b* may be concentrically inserted between the right tubular housing 8—8*a* and half-rings 5 and 9 to compensate for the insertion of insulating strip 5*a* and to allow symmetrical tightening of the half-rings 5 and 9. This conducting strip 5*b* will electrically connect the conducting segments 8 to the grounded rings 5, 9. Similar grounding provisions may readily be incorporated in the embodiment of FIGURES 1 and 2.

As best seen in FIGURE 3*a* reinforcing nuts 10 secured to the underside of flanges 12 of fixed half-rings 5 to receive clamping bolts 11 which extend through the mating flanges 12 of the half-rings 9. The edges 12′ of flanges 12 of half-ring 9 are turned down and gaskets 13 may be positioned between the cooperating flanges 12 of half-rings 5 and 9. Gaskets 13 may be cemented to the ends of the flanges 12 to seat upon gaskets 15 cemented to the ends of the bus housing 8—8*a*. Insulating members 8*b* are interposed between gasket 13 and insulating strips 8*a* to occupy the circumferential spaces between conducting strips 8.

While the embodiments of FIGURES 1–3, 3*a* and 4 have shown the longitudinal conductors and longitudinal insulators thereof as being riveted together in an overlapping relationship, they could also be constructed in any desired manner which serves to provide a plurality of longitudinal conductor strips which are maintained in insulated relationship with one another.

By way of example, FIGURE 5 shows an embodiment of my invention wherein longitudinal conductor members 17, 18 and 19 are each provided with a hook end 20 and a protruding end 21 respectively. The two members 18 and 19 are then joined in the manner shown in FIGURE 5*a* wherein insulating medium 22 is bonded to the conductors 18, 19 so as to connect them together. If desired, insulated rivets or bolts may be inserted through the cooperating hook 20 and protrusion 21 to reinforce the mechanical connecton therebetween.

Short conducting members 17*a*, 18*a* are joined to conducting members 17, 18, respectively, in insulating relationship in the manner illustrated in FIGURE 5*a*. Member 17*a* includes protrusions 21, 21*a* at the ends thereof while member 18*a* includes a hook 20 at one end and a protrusion 21*a* at the other end. Conducting members 17—19, 17*a* and 18*a*, when joined by bonded insulators 22, form the upper half 98, of bus housing 100, which is identical to the lower half 99 of bus housing 100. Housing sections 98, 99 may be secured together along protrusions 21*a* by means of fasteners 97. Thus, bus housing 100 may readily be longitudinally split along protrusions 21*a* for the purposes of inspection and repair of the bus and insulators housed therein. It is to be noted that no insulation is required between housing sections 98, 99. This longitudinal split housing arrangement may readily be applied to the embodiments of my invention hereinbefore described as well as the embodiments of my invention to be hereinafter described.

FIGURE 6 shows a still further embodiment of my novel invention wherein the conductor strip 23 and conductor strip 24 are provided with protrusions 25 and 26 respectively which are easily adaptable to allow an insulated rivet or insulated bolt connection between the conducting member 23 and 24. This type connection is shown in detail in FIGURE 6*a* wherein the bolt 50 is insulated from the protrusion 25 of member 23 by the insulating washer 57*a* and tubular insulator sleeve 52 with steel washer 58*a* interposed between the head of bolt 50 and insulating washer 57*a*. Bolt 50 is then fastened by nut 53 to maintain the assembly rigid with insulating washer 57*b* and steel washer 58*b* being interposed between protrusion 26 and nut 53. Insulating strip 54 prevents direct contact between the protrusions 25 and 26 of members 23 and 24 respectively.

FIGURE 7 shows a perspective view of my novel bus housing, wherein the conducting members 8 are fastened to the insulating members 8*a* by any desired type of insulated fastening means as seen, for example, in FIGURES 1 and 2. One end of each of the conducting strips 8 of FIGURE 5 may be electrically connected to one another by the common conducting connecting means 28, which connecting means may be subsequently connected to a ground potential while the free end of conductors 8 float electrically. This type of construction may be desired when no ground connection is available at the ring 5 of FIGURE 3 or 4, or if a very positive ground connection is desired.

Hereinbefore I have illustrated the principle of my invention in connection with an isolated phase bus structure having circular housings although it will be apparent to those skilled in the art that my invention is equally applicable to square and rectangular housings such as those utilized with segregated and non-segregated phase bus structures. These types of bus structures also have limitations in that the housing heats due to currents induced therein. Hence my invention can be applied to segregated and non-segregated bus structures to thereby enable one to build a larger size or rating structure than would be possible with a continuous housing. FIGURE 8 illustrates my novel invention taken in conjunction with a non-segregated bus structure 200, the single rectangular housing of which is comprised of longitudinally extending conducting strips 201 connected in insulated relationship with one another by the longitudinally extending strips 202. Clearly any desired fastening means could be utilized in connecting the conducting strips 201 to the insulating strips 202 such as the rivets 203 illustrated. Each bus bar 205 is maintained in position by longitudinally spaced insulating standoffs 206, arranged in groups of four, which are each inclined at 45° to the surfaces of the common bus housing. One end of each insulator 206 bears against harness ring 207 which surrounds bus bar 205 in the regions of insulators 206. The other end of each insulator 206 is mounted to locating member 208 which extends, at right angles, from the 45° surfaces 209 or 210 of corner brackets 211 and center brackets 212 respectively.

Each of the brackets 211, 212 bridge a conducting strip 201 and are secured to two insulating strips 202 by means of fasteners 213, 214. Vertically extending rods 215 are secured at their opposite ends to two center brackets 212 thereby providing bracing for the housing.

FIGURE 9 shows how my novel invention may be applied to a bus duct of the type which extends through its ring supports. Thus in FIGURE 9, the bus housing sections 40 and 41, each of which may be constructed as shown in FIGURE 5, extend through the ring supports 42 and 43 respectively. More specifically, bus housing section 40 is comprised of conducting members **40*a* which are connected in insulated relationship with one another by insulating members 40*b* by any of the above described manners. Similarly, bus housing section 41 comprises the conducting members 41*a* connected in insulating relationship with one another by insulating members 41*b*. Each of the metallic segments 40*a* of section 40 may be interconnected by conducting ground strap 44 while insulating member 45, having the same dimensions as conducting strap 44, encloses one end of section 41. The two sections 40 and 41 are then mechanically connected to one another by the conducting ring 46 which may clamp around strap members 44 and 45, the insulating strap members 40*b*, 41*b* and metallic segments 40*a* and 41*a*. The housing sections 40 and 41 are maintained in insulated relation with their respective supporting rings 42 and 43 in any desirable manner, for example in the maner that the left housing section of FIGURE 4 is insulated from half-rings 5—9 by the insulating strip 5*a***.

In each of the embodiments described heretofore, it has been seen that a plurality of longitudinal electrical conductors which are held in insulated relationship with respect to one another is utilized as the housing for enclosing the bus. When the bus enclosed by the housing, such as the bus 1 of FIGURE 3, is energized, voltages will be induced in each of the longitudinal strips 8 which voltage is in the same direction as the direction of the bus run. Since, however, the plurality of longitudinal segments 8 serve to substantially limit the voltage unbalance throughout the strip, the induced current within this strip is substantially reduced over that which would have existed had the conducting housing been a continuous body.

In view of this reduction in induced current within the housing, the heating of the housing will be substantially reuced to thereby allow a decreased bus temperature for the same heat dissipation from the bus bar 1. That is to say, since the bus bar must be at a higher temperature than the housing to allow heat flow from the bus bar to regions external thereof, a reduction in the temperature of the housing will allow a reduction in the temperature of the bus bar for the same heat dissipation.

Therefore, my novel housing will permit the operation of a given bus bar at a lower temperature than would be the case of a solid housing or, if desired, the temperature may be maintained at a constant value and the size or cross-sectional area of the bus bar can be reduced.

The alternate section housing arrangement of my invention also permits a saving of material, prior art attempts to minimize the losses in the housing having resulted in thick housings to reduce the resistance of the current path. However, with the housing of my invention there is limited current flow in the housing so that thinner material can be used and still maintain a low $I^2R$ loss even though the resistance is high.

Although I have here described preferred embodiment of my novel invention, many variations and modifications will now be apparent to those skilled in the art, and I therefore prefer to be limited, not by the specific disclosure herein, but only by the appending claims.

I claim:

1. An elongated housing for enclosing an elongated electrical conductor; said housing being constructed of a plurality of longitudinal metallic members extending substantially parallel to said electrical conductor; each of said metallic members having protrusions along the longitudinal edges thereof; a plurality of insulating strips interposed between adjacent metallic members adjacent to said protrusions; and means comprising insulated bolted connections securing adjacent metallic members to one another so as to form a rigid housing structure which presents a high impedance to induced currents; insulating stand-off means mounted between said enclosure and said conductor for supporting said conductor in spaced relationship from said enclosure, fluid insulating means occupying the region between said enclosure and said conductor.

2. An elongated housing for enclosing an elongated electrical conductor; said housing comprising at least two bolted together longitudinal portions; each of said portions comprising a plurality of longitudinally extending metallic members; all but one of said metallic members having a hooked long edge; each of said plurality of conductors having a protruding long edge; a plurality of insulating strips bonded to said protrusions and also bonded to the inner surface of said hooked edge; said protrusion of one of said metallic members being entered into said hooked edge of a second of said metallic members with said insulating strips maintaining the metallic members of each of said portions insulated from one another thereby minimizing currents induced therein, said bolted portions being adapted to permit said housing to be easily opened for maintenance or inspection of said conductor; insulating stand-off means mounted between said enclosure and said conductor for supporting said conductor in spaced relationship from said enclosure, fluid insulating means occupying the region between said enclosure and said conductor.

References Cited in the file of this patent

UNITED STATES PATENTS

| | | |
|---|---|---|
| Re. 23,811 | Scott | Mar. 30, 1954 |
| 281,064 | Hendley | July 10, 1883 |
| 346,250 | Wheaton | July 27, 1886 |
| 403,262 | Garland | May 14, 1889 |
| 2,275,203 | Rudd | Mar. 3, 1942 |
| 2,356,708 | Sileck | Aug. 22, 1944 |
| 2,387,783 | Towney | Oct. 30, 1945 |
| 2,433,181 | White | Dec. 23, 1947 |
| 2,718,542 | Lapsley | Sept. 20, 1955 |
| 2,775,643 | Scott | Dec. 25, 1956 |

FOREIGN PATENTS

| | | |
|---|---|---|
| 7,607 | Great Britain of 1915 | May 20, 1915 |
| 463,676 | Great Britain | Apr. 5, 1937 |
| 481,001 | Great Britain | Mar. 3, 1938 |
| 545,564 | Canada | Aug. 27, 1957 |

OTHER REFERENCES

Ufer, British patent specification 416,564, June 19, 1933.